Oct. 12, 1948.  J. H. KEMP, JR  2,451,226
APPARATUS FOR HANDLING LOADS
Filed Dec. 10, 1946  2 Sheets-Sheet 1
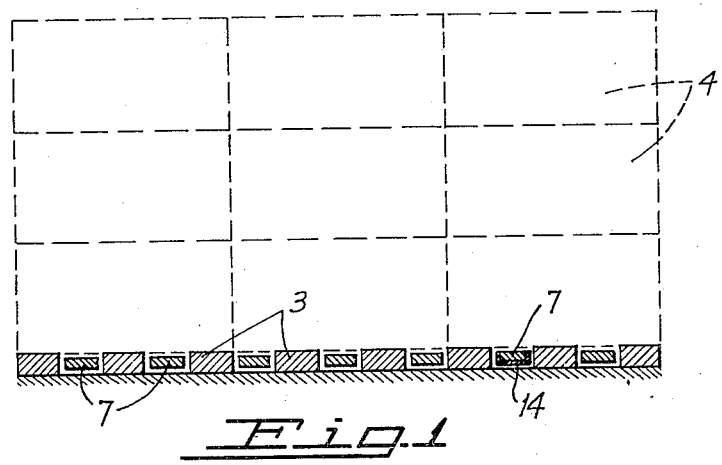
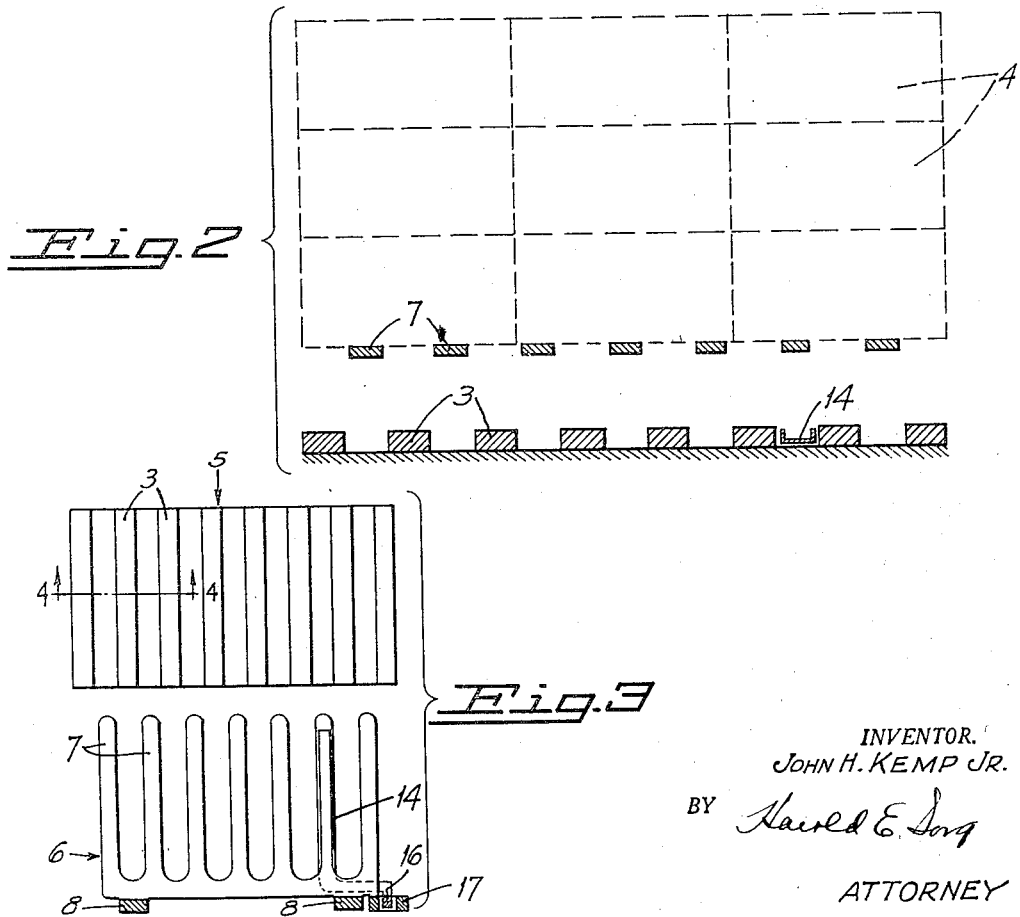
INVENTOR.
JOHN H. KEMP JR.
BY
ATTORNEY Oct. 12, 1948.  J. H. KEMP, JR  2,451,226
APPARATUS FOR HANDLING LOADS
Filed Dec. 10, 1946  2 Sheets-Sheet 2

INVENTOR.
JOHN H. KEMP JR.
BY Harold E. Long
ATTORNEY

Patented Oct. 12, 1948

2,451,226

UNITED STATES PATENT OFFICE 2,451,226

APPARATUS FOR HANDLING LOADS

John H. Kemp, Jr., San Carlos, Calif.

Application December 10, 1946, Serial No. 715,175

6 Claims. (Cl. 214—113)

My invention relates to the handling of a load of parcels such as a load of boxes, cartons, bags or the like, and more particularly to improvements in load carrying devices involving pallets and associated lifting forks.

It has been common practice to use small portable platforms commonly called pallets to aid in the handling and transportation of goods. These flat top pallets are usually about 3' x 5' in size, upon which a load of a ton or more of parcels such as cartons of canned goods, sacks of sugar or the like may be stacked. The loaded pallets are lifted and hauled about a local area, say on a dock or within a warehouse, by an operator on a small power operated vehicle or truck having an elevator fork with a pair of tines adapted to engage under the pallet. By this apparatus it is possible to transfer a loaded pallet from the floor to the bed of a large transportation truck and back again, or from one floor area to another, thereby eliminating much separate man handling of individual parcels.

The above mentioned apparatus, while satisfactory to the extent it can be used, has limitations because it is not possible to transfer a load from a lifting fork to a pallet, or from one pallet to another. Also, the pallets heretofore used are not of the best construction for the uses involved.

In view of these limitations the broad object of my invention is to provide a method and apparatus whereby a load may be deposited from a lifting fork directly onto a pallet or transferred from one pallet to another without individually handling the parcels of the load.

Another object of my invention is to provide apparatus of the character described which is useful in connection with load carrying decks other than portable pallets.

A further object is to provide an improved and simplified pallet construction.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claims.

Referring to the drawings:

Figure 1 is a diagrammatic sectional view of apparatus embodying improvements of my invention showing the tines of a fork engaged between ribs of a load carrying deck or pallet; and Figure 2 is a similar view showing the fork above the deck with a guide tine only engaged between the ribs.

Figure 3 is a plan view of a pallet and fork in disengaged position.

Figure 4:
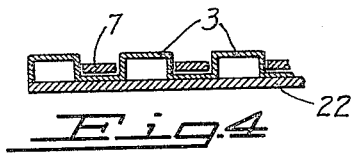
Figure 4 is a fragmentary vertical sectional view taken in a plane indicated by line 4—4 of Figure 3 illustrating my improved pallet construction and showing the fork tines inserted between the hollow ribs.

In terms of broad inclusion, my apparatus for handling a load comprises a deck having spaced ribs for supporting the load, a lifting fork having load carrying tines spaced and proportioned for engagement with the spaces between the ribs, and means for establishing alignment of the tines with such spaces. In the preferred apparatus a guide means is provided including a guide member mounted for movement with the fork. Auxiliary guide means is also preferably provided on the deck. The improved method involves lowering a loaded fork onto the deck, guiding the tines into meshing engagement with the ribs so as to transfer the load from the fork to the deck, and then withdrawing the tines endwise from between the ribs. My improved pallet comprises hollow load supporting ribs having open ends arranged along an edge of the pallet.

In greater detail, and referring first to Figures 1 and 2 of the drawing, my apparatus comprises a load carrying deck having a series of spaced parallel ribs 3 supporting the load 4 of parcels. These parcels may be boxes, cartons, bags or other conventional containers for the goods being handled. It is desirable to handle parcels of this kind in a group weighing up to a ton or more, and such loads are contemplated in my apparatus. Ribs 3 may be of any suitable material such as metal or wood and may be either fastened to a fixed platform or formed as part of a portable pallet. Such a pallet is generally indicated by reference numeral 5 in Figures 3, 6 and 7. If of pallet construction I prefer to use a hollow rib structure as hereinafter described. The ribs are preferably about 3 inches wide and are preferably spaced a like distance apart, which spacing insures adequate support for individual parcels of the load.

My apparatus also comprises a lifting fork 6 having parallel tines 7 spaced and proportioned for engagement with the spaces between ribs 3. These tines are preferably flat metal bars and are adapted to support the load independently of the deck. Tines about 2½ inches wide and spaced to mesh with ribs 3 are satisfactory. Figure 1 shows the load supported on ribs 3 and Figure 2 shows the load supported by the fork above the deck. As best shown in Figure 3, the tines of fork 6 are joined at the base ends, preferably as an integral structure, and project outwardly with their upper surfaces lying substantially in a common plane. The plurality of closely spaced tines thus provides an ample supporting surface for the parcels making up the load. This feature together with the interengageability of the tines with ribs 3 makes it possible to insert the tines endwise and lift a load from the deck. And, what is equally important, this feature makes it possible to lower a loaded fork onto the deck and withdraw the tines endwise to leave the load resting on ribs 3. When using a portable pallet it is understood that both pallet and load may be simultaneously lifted by engaging the fork under the supporting deck of the pallet.

Figure 6:
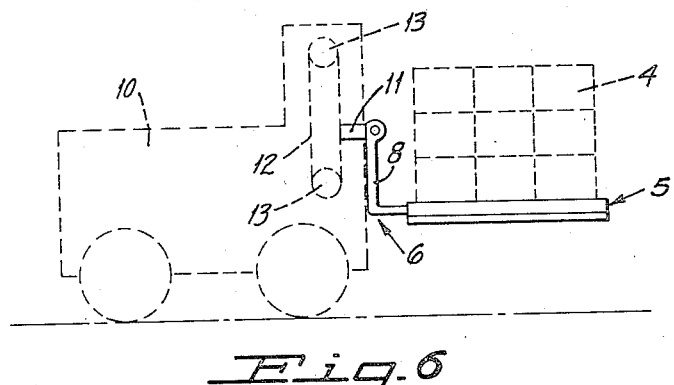
Figure 6 is a diagrammatic side elevational view of my apparatus showing the fork of a truck supporting a loaded pallet.
Figure 7:
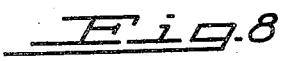
Figure 7 is a similar view showing the guide tine inserted prior to lowering the loaded fork.

With reference to Figures 6 and 7, fork 6 is preferably mounted on a small truck 10 indicated in diagrammatic outline by dotted lines, which truck is preferably of a type which is self powered and steerable by an operator. In the structure illustrated the fork is provided with upstanding arms 8 fastened to a crossbar 11 on the front of the truck. Suitable elevator means is also provided on the truck for raising and lowering the fork while maintaining the tines substantially horizontal. A chain 12 driven by sprockets 13 is shown connected to crossbar 11, but any other type of elevator mechanism may be employed. Figure 6 shows the fork carrying a loaded pallet while Figure 7 shows the fork carrying a load independently of the pallet. The latter figure also illustrates guide mechanism utilized when transferring a load from the fork to the pallet.

An important feature of my invention is that means are provided for establishing alignment of the load carrying tines 7 with the spaces between ribs 3. The importance of this feature will be appreciated when it is realized that load 4 hides the underlying parts and makes it impossible for an operator to see either tines 7 or ribs 3 when a loaded fork is being lowered onto the pallet. The preferred aligning means comprises a guide member mounted for movement with the fork, such as auxiliary channel-shaped tine 14 registering with one of the load carrying tines 7. This guide is mounted for movement in unison with the fork and is also mounted for relative movement so that it may be lowered independently of the load carrying tines 7. Figure 1 shows the guide tine in retracted position against a tine 7 and Figure 2 shows tine 14 in its guiding position below the other tines.

Figure 8:
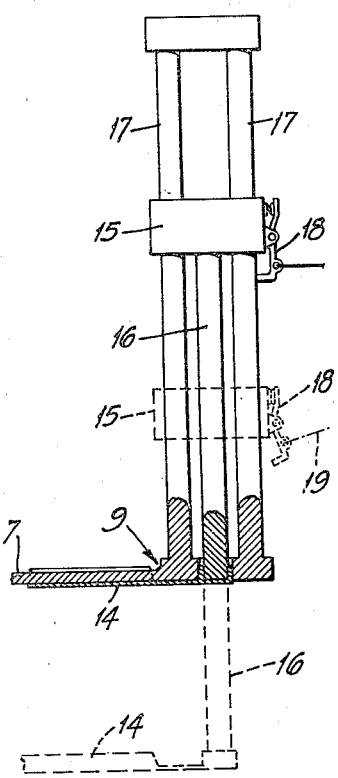
Figure 8 is a detail view showing the preferred guide mechanism.

As best seen in Figure 8 the guide tine 14 is supported on the base of a vertical plunger rod 16 having an end block 15 slideable on vertical bars 17 secured at their lower ends to the rear end of the fork as indicated at 9. These bars 17 may be arranged in line with the guide tine as illustrated in Figure 8, or may be arranged at a rear corner of the fork as shown in Figure 3 with an offset arm connecting the guide tine with the base of rod 16. A spring pressed latch 18 on block 15 frictionally engaging bar 17 serves to hold the guide tine in extended or retracted position. A pull cord 19 enables an operator to release the latch for dropping the guide tine independently of the fork. By this arrangement the retracted guide tine becomes a part of the fork and moves in unison with the other tines when the fork is raised and lowered by the elevator mechanism. So retracted the guide tine does not interfere with the normal operation of the lifting fork. When it it desired to deposit a load on the pallet the operator first releases latch 18 to drop guide tine 14 to the extended position shown in Figure 7. Tine 14 is now visible to the operator so that he may steer the truck forward to engage the guide tine into its proper space between ribs 3. Continued forward movement of the truck to fully insert tine 14 also serves to shift or pivot the pallet, if necessary, to bring ribs 3 into parallelism with the tines. After insertion of tine 14 the operator actuates the elevator mechanism to lower the fork onto the pallet. Automatic registration of tines 7 with the spaces between ribs 3 is of course assured by the prior alignment established by the guide tine. Once the weight of the load has been transferred to ribs 3 the fork may be withdrawn by merely backing up the truck. Instead of one guide tine it is understood that two or more may be employed. Two guide tines, one adjacent each end of the fork, have advantages of rigidity and stability.

Figure 9:
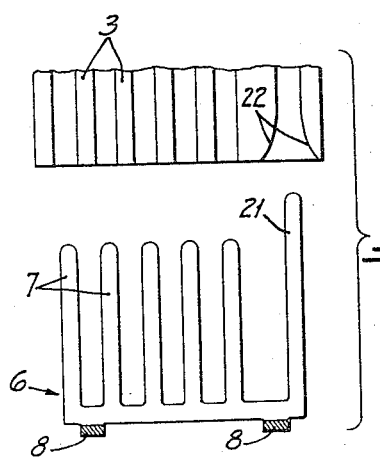
Figure 9 is a plan view showing a modified guide means.

An alternate guide means is illustrated in Figure 9. Here the guide member 21 is a fixed part of the fork and comprises an outboard tine so spaced apart from the load carrying tines 7 that it lies alongside the load and hence in the view of the operator. In this construction the guide tine 21 is preferably longer than the other tines so that the projecting end is adapted for insertion prior to the other tines. The pallet in this case has an auxiliary guide groove formed by a space between ribs disposed alongside those which support the load.

Figure 9 also illustrates additional guide means on the pallet to assist engagement of guide member 21 on the fork. Such guide means comprises tapered ends 22 of the ribs which form the guide groove. These tapered or outwardly flared ends assist the operator in bringing the guide member 21 into register with the guide groove.

Figure 5:
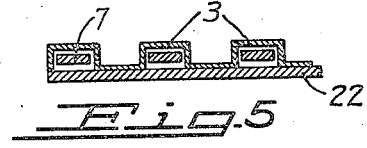
Figure 5 is a similar view showing the tines engaged in the ribs.

Another feature of my invention, which has advantages either with or without the guide feature heretofore described, relates to improvements in the pallet construction. As shown in Figures 4 and 5, the improved pallet comprises a load carrying deck constructed of a corrugated sheet of suitable material such as metal so that the upstanding corrugations form the ribs 3. The advantages of this construction are many. For one thing, the ribs are hollow and thereby permit insertion of the fork tines into the ribs for simultaneously lifting the pallet and supported load. Figure 5 illustrates the tines so inserted. The spaces provided between the ribs of the corrugated sheet enables the tines to be inserted between the ribs for lifting the load from the pallet in the manner heretofore described. Figure 4 shows the tines inserted for lifting the load independently of the pallet. A base 23 under the corrugated sheet is preferably provided for reinforcement.

The usual pallet construction involves a flat deck with legs to permit a two prong fork to be inserted under the deck. Such conventional pallets necessarily involve considerable height, and are not as compact as my improved pallet of the corrugated construction having open-ended corrugations along one side of the pallet to permit endwise insertion of the lifting fork. Another feature of my pallet is that the corrugated construction permits the pallets to be nested together, face to face, when not in use, thus conserving space in storage. The corrugated structure also is of lighter weight and more durable than previously made pallets.

I claim:

1. In apparatus for depositing a load on a support having a load receiving surface provided with parallel grooves, the combination with a lifting fork having load-carrying tines dimensioned and spaced for reception in said grooves, whereby the load may be transferred to said surface when said tines are located in said grooves, an element displaceable with respect to and in advance of said tines to a position in proximity to said surface to denote the position of said tines with respect to said grooves, a common mount for said fork and said element, and operating mechanism on said mount for effecting independent displacement of said element and said fork and for positioning said tines in said grooves.

2. In apparatus for depositing a load on a support having a load receiving surface provided with parallel grooves, the combination with a lifting fork having load-carrying tines dimensioned and spaced for reception in said grooves, whereby the load may be transferred to said surface when said tines are located in said grooves, an element displaceable with respect to and in advance of said tines to a position engageable with one of said grooves to denote the position of said tines with respect to said grooves, a common mount for said fork and said element, and operating mechanism on said mount for effecting independent displacement of said element and said fork and for positioning said tines in said grooves.

3. In apparatus for depositing a load on a support having a load receiving surface provided with parallel grooves, the combination with a lifting fork having load-carrying tines dimensioned and spaced for reception in said grooves, whereby the load may be transferred to said surface when said tines are located in said grooves, an element normally disposed beneath one of said tines and displaceable downwardly with respect to and in advance of said tines to a position engageable with one of said grooves to effect correct initial positioning of said tines with respect to said grooves, a common mount for said fork and said element, and operating mechanism on said mount for effecting independent downward displacement of said element and said fork and for positioning said tines in said grooves.

4. In apparatus for depositing a load on a support having a load receiving surface provided with parallel grooves, the combination with a lifting fork having load-carrying tines dimensioned and spaced for reception in said grooves, whereby the load may be transferred to said surface when said tines are located in said grooves, an element normally disposed beneath one of said tines and displaceable downwardly with respect to and in advance of said tines to a position engageable with one of said grooves to effect correct initial positioning of said tines with respect to said grooves, a common vehicular mount for said fork and said element, and operating mechanism for effecting independent downward displacement of said element and said fork and for positioning said tines in said grooves.

5. In mobile apparatus for conveying and depositing a load on a pallet having a load receiving surface provided with parallel grooves, the combination with a vertically displaceable lifting fork having load-carrying tines dimensioned and spaced for reception in said grooves, whereby the load may be transferred to said surface when said tines are located in said grooves, an element displaceable vertically with respect to and in advance of said tines to a position in proximity to said surface to denote the position of said tines with respect to said grooves, a common vehicular mount for said fork and said element, and operating mechanism for effecting independent vertical displacement of said element and said fork and for positioning said tines in said grooves.

6. In apparatus for depositing a load on a support having a load receiving surface provided with parallel grooves, the combination with a lifting fork having load-carrying tines dimensioned and spaced for reception in said grooves, whereby the load may be transferred to said surface when said tines are located in said grooves, an element separate from said tines and coacting with the fork to denote the position of the tines with respect to said grooves, a common mount for said fork and element, and operating mechanism on said mount for effecting displacement of said fork and for positioning said tines in said grooves.

JOHN H. KEMP, Jr.

REFERENCES CITED

The following references are of record in the file of this patent:

UNITED STATES PATENTS

| Number | Name | Date |
| --- | --- | --- |
| 1,271,413 | Allen | July 2, 1918 |
| 1,612,382 | Lehman | Dec. 28, 1926 |
| 1,742,384 | Fitzgerald, Jr. | Jan. 7, 1930 |
| 2,256,454 | Bomar | Sept. 16, 1941 |
| 2,393,902 | Hastings, Jr. | Jan. 29, 1946 |
| 2,412,184 | Ulinski | Dec. 3, 1946 |